US012809423B2

(12) United States Patent
Jung et al.

(10) Patent No.: US 12,809,423 B2
(45) Date of Patent: Nov. 24, 2026

(54) DISPLAY DEVICE AND METHOD OF MANUFACTURING THE SAME

(71) Applicant: Samsung Display Co., Ltd., Yongin-si (KR)

(72) Inventors: Suk Won Jung, Yongin-si (KR); Youngdo Kim, Yongin-si (KR); Junehyoung Park, Yongin-si (KR); Junwoo You, Yongin-si (KR); Changmoo Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 622 days.

(21) Appl. No.: 18/115,948

(22) Filed: Mar. 1, 2023

(65) Prior Publication Data

US 2023/0393629 A1 Dec. 7, 2023

(30) Foreign Application Priority Data

Jun. 2, 2022 (KR) ........................ 10-2022-0067303

(51) Int. Cl.
*G06F 1/16* (2006.01)
*G06F 1/20* (2006.01)

(52) U.S. Cl.
CPC ............ *G06F 1/1656* (2013.01); *G06F 1/203* (2013.01)

(58) Field of Classification Search
None
See application file for complete search history.

(56) References Cited

U.S. PATENT DOCUMENTS

| | | | | |
|---|---|---|---|---|
| 7,214,889 | B2 | 5/2007 | Mazurkiewicz | |
| 8,156,644 | B2 | 4/2012 | Babb et al. | |
| 10,691,921 | B2 | 6/2020 | Seo et al. | |
| 2011/0273906 | A1* | 11/2011 | Nichol | G02B 6/0028 445/24 |
| 2017/0145183 | A1* | 5/2017 | Hebrink | C08K 3/105 |
| 2018/0053451 | A1* | 2/2018 | Han | H10K 59/873 |
| 2018/0181165 | A1* | 6/2018 | Park | H10K 59/126 |
| 2019/0280224 | A1 | 9/2019 | Wang et al. | |
| 2020/0295302 | A1 | 9/2020 | Yun et al. | |
| 2020/0325952 | A1* | 10/2020 | Ryu | B32B 9/04 |

FOREIGN PATENT DOCUMENTS

| | | |
|---|---|---|
| GB | 2580211 | 7/2020 |
| KR | 10-1859723 | 5/2018 |
| KR | 10-2019-0030907 A | 3/2019 |
| KR | 10-2154522 | 9/2020 |
| KR | 10-2020-0120996 A | 10/2020 |
| KR | 10-2021-0153495 | 12/2021 |

* cited by examiner

*Primary Examiner* — Anthony J Frost
(74) *Attorney, Agent, or Firm* — F. CHAU & ASSOCIATES, LLC

(57) ABSTRACT

A display device includes a display panel, a protective film disposed under the display panel, a reflective layer disposed under the protective film and including a metal, and a protective layer disposed under the reflective layer and provided in a single layer. The protective layer includes a base portion, a light absorbent, and a polymer bead. The light absorbent includes a black pigment or a black dye and is dispersed in the base portion. The display device has improved impact resistance, visibility, and reliability.

20 Claims, 8 Drawing Sheets

DISPLAY DEVICE AND METHOD OF MANUFACTURING THE SAME

CROSS REFERENCE TO RELATED APPLICATIONS(S)

This application claims priority to and benefits of Korean Patent Application No. 10-2022-0067303 under 35 U.S.C. § 119, filed on Jun. 2, 2022, in the Korean Intellectual Property Office (KIPO), the entire contents of which are incorporated herein by reference.

BACKGROUND

1. Technical Field

The disclosure relates to a display device including a reflective layer and a protective layer, which are disposed under a display panel, and a method of manufacturing the display device.

2. Description of the Related Art

Various types of display devices that are applied to multimedia devices, such as television sets, mobile phones, tablet computers, game units, or the like, are being developed. Display devices include a variety of functional layers to provide color images having superior quality to users.

In recent years, studies on a display device having a thin thickness are being conducted to implement various types of display devices, such as a display device including a curved surface, a rollable display device, or a foldable display device. The display device having a thin thickness is implemented by reducing the number of functional layers and providing a functional layer having multiple functions.

When implementing the display device with a thin thickness, it is required for the display device to have an impact resistance property. To this end, researches on display devices with excellent impact resistance and optical properties are being conducted.

SUMMARY

The disclosure provides a display device with improved impact resistance, visibility, and reliability. The disclosure provides a method of manufacturing a display device with improved impact resistance, visibility, and reliability. Embodiments of the disclosure provide a display device that may include a display panel, a protective film disposed under the display panel, a reflective layer disposed under the protective film and including a metal, and a protective layer disposed under the reflective layer and provided in a single layer. The protective layer may include a base portion, a light absorbent, and a polymer bead. The light absorbent may include a black pigment or a black dye and may be dispersed in the base portion.

The protective layer may be disposed directly on a lower surface of the reflective layer.

The base portion may include an acrylic resin or a silicone resin.

The light absorbent may absorb visible light.

The reflective layer may be disposed directly on a lower surface of the protective film.

The reflective layer may include at least one of Ag, Mg, Cu, Al, Pt, Pd, Au, Ni, Nd, Ir, Cr, Li, Ca, Mo, Ti, and W.

The display device may further include a heat dissipation layer disposed under the protective layer.

The protective layer may include about 20 vol % or more of the light absorbent in relation to a total volume of the protective layer.

The protective layer may include about 20 vol % or more of the polymer bead in relation to a total volume of the protective layer.

The polymer bead may include a shell portion including a polymer, and a core portion including gas and surrounded by the shell portion.

A thickness of the protective layer may be equal to or greater than about 150 micrometers and equal to or less than about 200 micrometers.

An optical density of the protective layer may be equal to or greater than about 3.

Embodiments of the disclosure provide a display device that may include a display panel, a window disposed on the display panel, and a lower member disposed under the display panel. The lower member may include a protective film, a reflective layer disposed directly on a lower portion of the protective film and including a metal, and a protective layer disposed directly on a lower portion of the reflective layer. The protective layer may include a base portion, a light absorbent, and a polymer bead. The light absorbent may include a black pigment or a black dye and may be dispersed in the base portion.

The reflective layer may include at least one of Ag, Mg, Cu, Al, Pt, Pd, Au, Ni, Nd, Ir, Cr, Li, Ca, Mo, Ti, and W.

The protective layer may include about 20 vol % or more of the light absorbent in relation to a total volume of the protective layer.

The protective layer may include about 20 vol % or more of the polymer bead in relation to a total volume of the protective layer.

The polymer bead may include a shell portion including a polymer and a core portion including gas and surrounded by the shell portion.

An optical density of the protective layer may be equal to or greater than about 3.

Embodiments of the disclosure provide a method of manufacturing a display device. The method may include providing a display panel, providing a protective film on the display panel, providing a reflective layer including a metal on the protective film, and providing a protective layer on the reflective layer. The providing of the protective layer may include providing a coating composition including a base resin, a light absorbent including a black pigment or a black dye, a polymer bead, and a photoinitiator on the reflective layer to form a coating layer, and irradiating ultraviolet light to the coating layer from above a surface of the coating layer spaced apart from the reflective layer to form the protective layer.

The irradiating of the ultraviolet light to form the protective layer may include providing direct light directly to the surface of the coating layer, and providing indirect light provided by the direct light passing through the coating layer and reflected by the reflective layer.

The photoinitiator may be activated by the ultraviolet light.

The method may further include providing a heat dissipation layer on the protective layer after the providing of the protective layer on the reflective layer.

The reflective layer may include at least one of Ag, Mg, Cu, Al, Pt, Pd, Au, Ni, Nd, Ir, Cr, Li, Ca, Mo, Ti, and W.

The providing of the reflective layer may include depositing the metal or coating the metal in a paste on the protective film.

A thickness of the coating layer may be equal to or greater than about 150 micrometers and equal to or less than about 200 micrometers.

According to an embodiment, a display device may include a protective layer disposed under a display panel and including a light absorbent and a polymer bead, and thus, the display device may have an excellent impact resistance and reliability.

According to an embodiment, a method of manufacturing a display device may include providing a protective layer under a reflective layer. The display device may include a protective layer including a light absorbent and a polymer bead, and the protective layer may be cured by indirect light as well as direct light.

BRIEF DESCRIPTION OF THE DRAWINGS

The above and other advantages of the disclosure will become readily apparent by reference to the following detailed description when considered in conjunction with the accompanying drawings wherein.

DETAILED DESCRIPTION OF THE EMBODIMENTS

Figure 1:
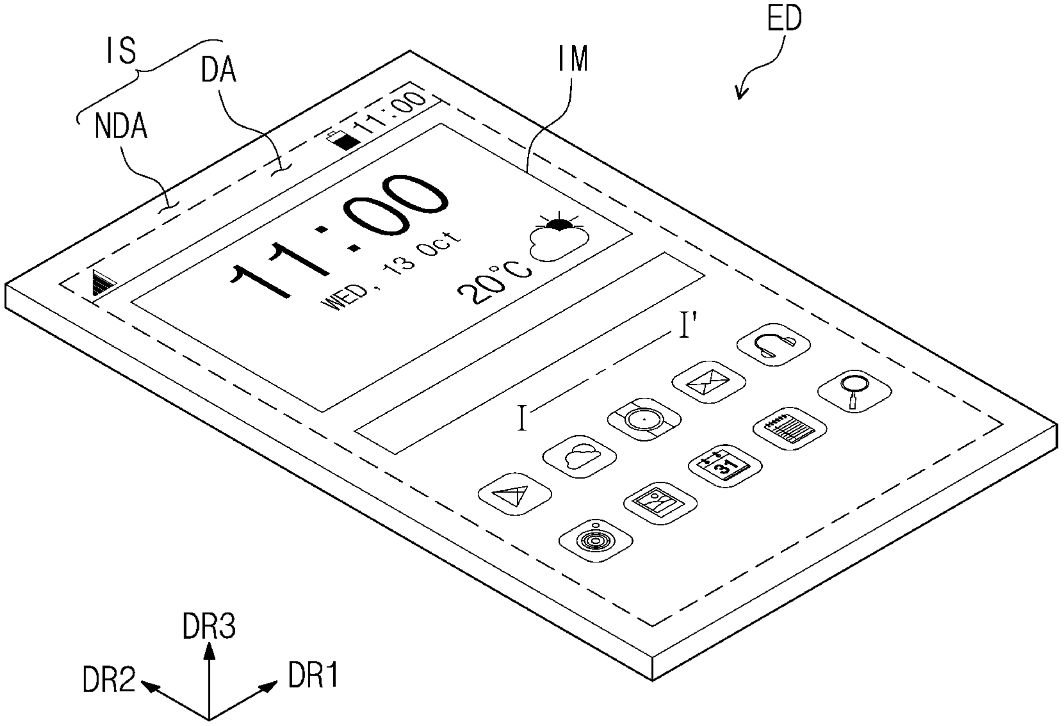
FIG. 1 is a perspective view of a display device according to an embodiment of the disclosure.

The disclosure may be variously modified and realized in many different forms, and thus specific embodiments will be illustrated in the drawings and described in detail hereinbelow. However, the disclosure should not be limited to the specific disclosed forms, and be construed to include all modifications, equivalents, or replacements included in the spirit and scope of the disclosure.

In the disclosure, it will be understood that when an element (or area, layer, or portion) is referred to as being “on”, “connected to” or “coupled to” another element or layer, it can be directly on, connected or coupled to the other element or layer or intervening elements or layers may be present. To this end, the term “connected” may refer to physical, electrical, and/or fluid connection, with or without intervening elements.

However, when an element is referred to as being “directly connected” to another element, there are no intervening elements present between a layer, film region, or substrate and another layer, film, region, or substrate. For example, the term “directly connected” may mean that two layers or two members are disposed without employing additional adhesive therebetween.

Like numerals refer to like elements throughout. In the drawings, the thickness, ratio, and dimension of components are exaggerated for effective description of the technical content.

In the specification and the claims, the phrase “at least one of” is intended to include the meaning of “at least one selected from the group of” for the purpose of its meaning and interpretation. For example, “at least one of A and B” may be understood to mean “A, B, or A and B.” In the specification and the claims, the term “and/or” is intended to include any combination of the terms “and” and “or” for the purpose of its meaning and interpretation. For example, “A and/or B” may be understood to mean “A, B, or A and B.” The terms “and” and “or” may be used in the conjunctive or disjunctive sense and may be understood to be equivalent to “and/or.”

It will be understood that, although the terms first, second, etc. may be used herein to describe various elements, these elements should not be limited by these terms. These terms are only used to distinguish one element from another element. Thus, a first element discussed below could be termed a second element without departing from the teachings of the disclosure. As used herein, the singular forms, “a”, “an” and “the” are intended to include the plural forms as well, unless the context clearly indicates otherwise.

Spatially relative terms, such as “beneath”, “below”, “lower”, “above”, “upper” and the like, may be used herein for ease of description to describe one element or feature’s relationship to another elements or features as shown in the figures.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms “include” and/or “including”, when used in this specification, specify the presence of stated features, integers, steps, operations, elements, and/or components, but do not preclude the presence or addition of one or more other features, integers, steps, operations, elements, components, and/or groups thereof.

Hereinafter, a display device and a method of manufacturing the display device will be described with reference to accompanying drawings.

FIG. 1 is a perspective view of a display device ED according to an embodiment of the disclosure. FIG. 1 shows a mobile electronic device as a representative example of the display device ED. However, the display device ED may be applied to a large-sized electronic item, such as a television set, a monitor, an outdoor billboard, and the like, and a small and medium-sized electronic item, such as a personal computer, a notebook computer, a personal digital assistant, a car navigation unit, a game unit, a smartphone, a tablet computer, a camera, and the like. The display device ED may be also applied to other electronic devices as long as they do not depart from the technical spirit of the disclosure.

The display device ED may have a hexahedron shape with a thickness in a third directional axis DR3 on a plane defined by a first directional axis DR1 and a second directional axis DR2 crossing the first directional axis DR1. However, the disclosure is not limited thereto, and the display device ED may have a variety of shapes.

According to an embodiment, upper (or front) and lower (or rear) surfaces of each member may be defined with respect to a direction in which an image IM is displayed. The front and rear surfaces may be opposite to each other in the third directional axis DR3, and a normal line direction of each of the front and lower surfaces may be substantially parallel to the third directional axis DR3.

Directions indicated by the first, second, and third directional axes DR1, DR2, and DR3 may be relative to each other and may be changed to other directions. Hereinafter, first, second, and third directions respectively correspond to directions indicated by the first, second, and third directional axes DR1, DR2, and DR3 and are assigned with the same reference numerals as those of the first, second, and third directional axes DR1, DR2, and DR3.

The display device ED may display the image IM through a display surface IS. The display surface IS may include a display area DA in which the image IM is displayed and a non-display area NDA defined adjacent to the display area DA. The image IM may not be displayed through the non-display area NDA. The image IM may include a video or a still image. FIG. 1 shows multiple application icons and a clock widget as representative examples of the image IM.

The display area DA may have a quadrangular shape. The non-display area NDA may surround the display area DA. However, they should not be limited thereto or thereby, and the shape of the display area DA and the shape of the non-display area NDA may be designed relative to each other. In another embodiment, the non-display area NDA may not be disposed on a front surface of the display device ED.

The display device ED may be flexible. The electronic device DD may be flexible. The term “flexible” used herein refers to the property of being able to be bent, and the flexible electronic device may include all structures from a structure that may be completely bent to a structure that may be bent at the scale of a few nanometers. For example, the display device ED may be a curved display device or a foldable display device. However, it should not be limited thereto or thereby. According to an embodiment, the display device ED may be rigid.

Figure 2:
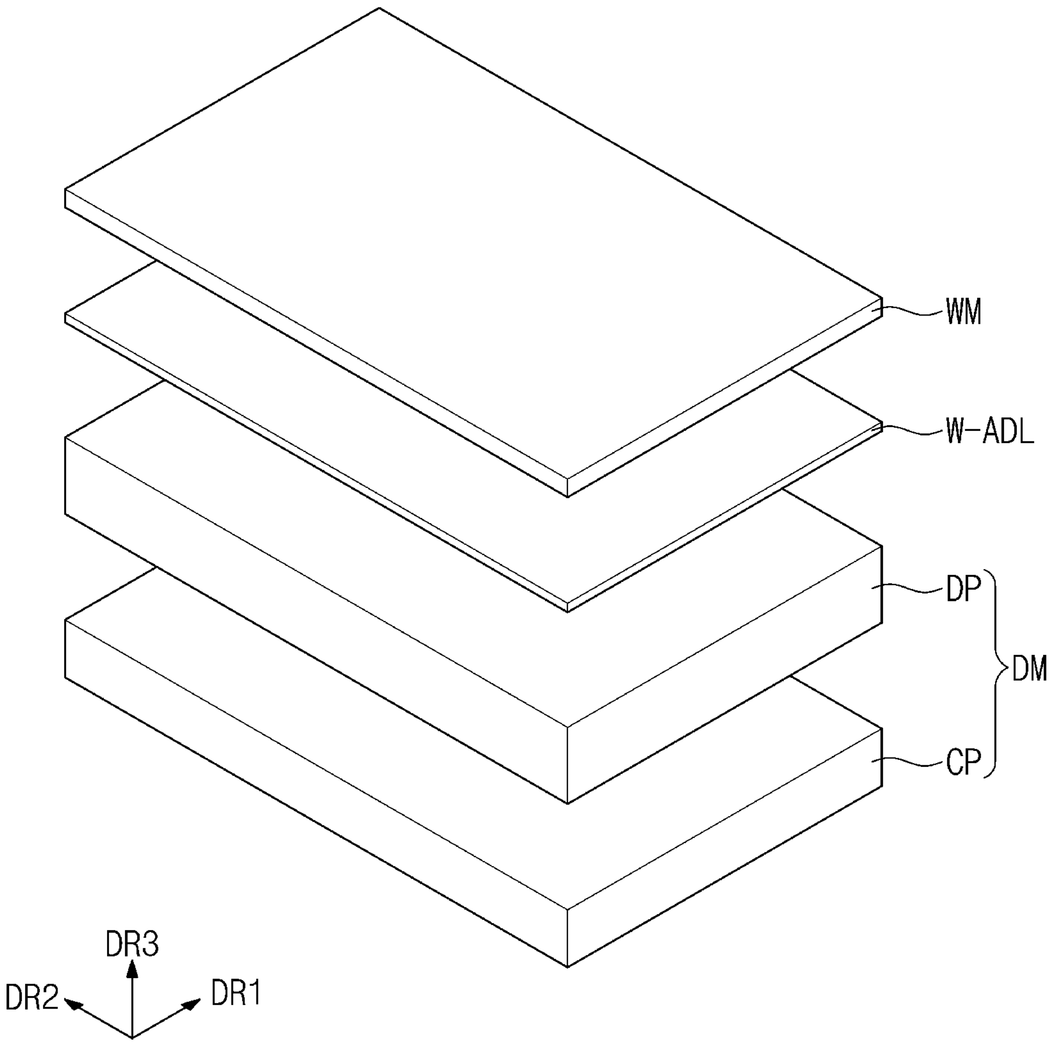
FIG. 2 is an exploded perspective view of a display device according to an embodiment of the disclosure.
Figure 3:
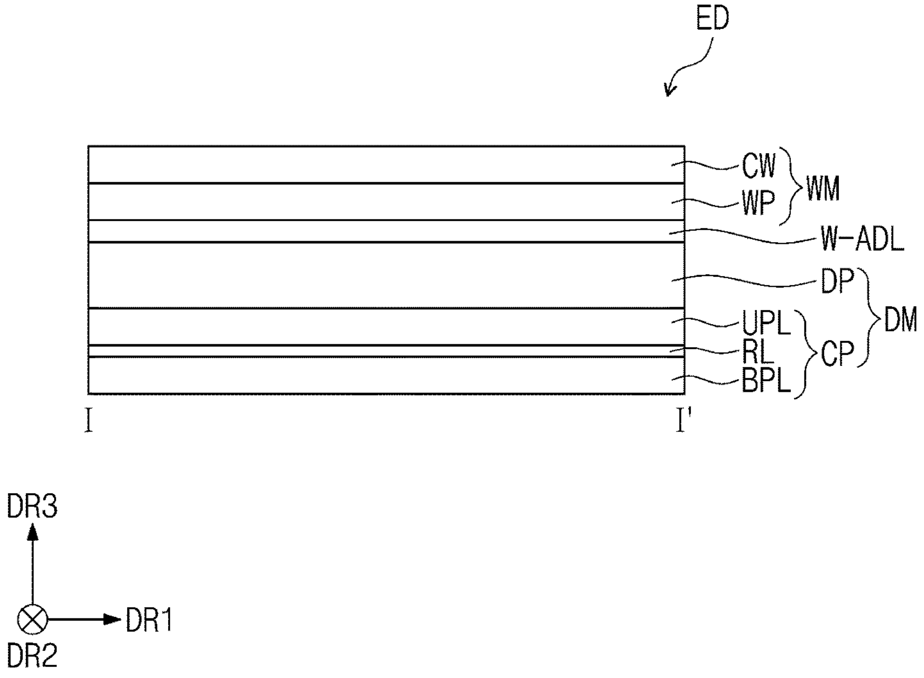
FIG. 3 is a schematic cross-sectional view of a display device according to an embodiment of the disclosure.
Figure 4:
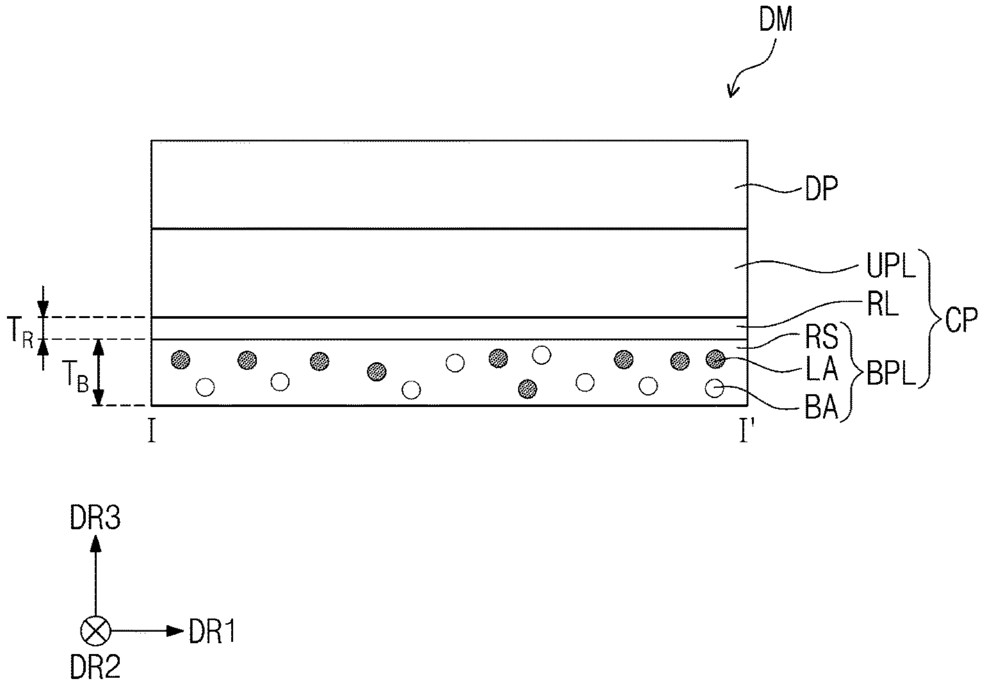
FIG. 4 is a schematic cross-sectional view of a display module according to an embodiment of the disclosure.

FIG. 2 is an exploded perspective view of the display device according to an embodiment of the disclosure. FIG. 3 is a schematic cross-sectional view of the display device ED according to an embodiment of the disclosure. FIG. 4 is a schematic cross-sectional view of a display module DM according to an embodiment of the disclosure.

Referring to FIGS. 2 to 4, the display device ED may include a lower member CP, a display module DM, and a window WM. The window WM may include an optically transparent insulating material. For example, the window WM may include a glass substrate or a synthetic resin film. In the case where window WM is a synthetic resin film, the window WM may include a polyimide (PI) film or a polyethylene terephthalate (PET) film.

The window WM may have a single-layer or multi-layer structure. For example, the window WM may include multiple synthetic resin films coupled to each other by an adhesive or may include a glass substrate and a synthetic resin film coupled to the glass substrate by an adhesive.

The window WM may include a glass substrate WP and a window protective film CW. The glass substrate WP may be attached to the display module DM by a window adhesive layer W-ADL. The window protective film CW may be disposed on the glass substrate WP.

The display module DM may include a display panel DP and the lower member CP. The lower member CP may include a protective film UPL, a reflective layer RL, and a protective layer BPL.

The display panel DP may include multiple pixels arranged in an area corresponding to the display area DA. The pixels may emit lights in response to electrical signals. The image IM (refer to FIG. 1) displayed by the lights from the pixels may be displayed through the display area DA (refer to FIG. 1) of the display device ED.

The display panel DP may include a display element layer (not shown). The display element layer may include an organic electroluminescent element, a quantum dot light emitting element, or a liquid crystal layer, however, the disclosure should not be limited thereto or thereby.

The display module DM may include the display panel DP, the protective film UPL, the reflective layer RL, and the protective layer BPL. The display panel DP may be disposed adjacent to the window WM. FIGS. 2 and 3 show a structure in which the window WM is disposed directly on the window adhesive layer W-ADL disposed on the display panel DP, however, the disclosure should not be limited thereto or thereby. For example, the display device ED may include at least one functional layer such as an optical layer (not shown) and a touch layer (not shown), which are disposed between the display panel DP and the window WM.

The protective film UPL may be disposed under the display panel DP. The protective film UPL may be disposed directly on a lower surface of the display panel DP. However, the disclosure is not limited thereto. For example, the protective film UPL may be attached to the display panel DP by an adhesive layer (not shown).

The protective film UPL may serve as a support layer that supports the display panel DP. The protective film UPL may include an organic material. For example, the protective film UPL may include polyethylene terephthalate (PET). However, the disclosure should not be limited thereto or thereby, and materials for the protective film UPL should not be particularly limited as long as the protective film UPL supports the display panel DP.

The reflective layer RL may be disposed under the protective film UPL. The reflective layer RL may be disposed directly on a lower surface of the protective film UPL. The reflective layer RL may be formed by depositing a metal on the protective film UPL using a deposition method or by coating metal paste on the protective film UPL. The reflective layer RL may have a thickness $T_R$ equal to or greater than about 0.05 μm and equal to or less than about 0.30 μm.

The reflective layer RL may include a metal. For example, the reflective layer RL may include at least one of Ag, Mg, Cu, Al, Pt, Pd, Au, Ni, Nd, Ir, Cr, Li, Ca, Mo, Ti, and W. For example, the reflective layer RL may include Ag or AgMg. The reflective layer RL may include Ag paste. The reflective layer RL may reflect light incident thereto from the outside of the reflective layer RL. The function of the reflective layer RL will be described in detail later in the method of manufacturing the display device.

The protective layer BPL may be disposed under the reflective layer RL. The protective layer BPL may be disposed directly on a lower surface of the reflective layer RL. The protective layer BPL may perform a function of blocking an external light and a function of impact resistance to protect the display panel DP from external impacts. The protective layer BPL may be directly coated on the lower surface of the reflective layer RL. A method of coating the protective layer BPL on the lower surface of the reflective layer RL will be described in detail later in the method of manufacturing the display device.

The protective layer BPL may include a base portion RS, a light absorbent LA dispersed in the base portion RS, and a polymer bead BA. For example, the base portion RS may include an acrylic resin or a silicone resin. The base portion RS may be a dispersion medium in which the light absorbent LA is dispersed. The protective layer BPL may have a single-layer structure of the base portion RS in which the light absorbent LA is dispersed. For example, the protective layer BPL may be formed by a single process.

The light absorbent LA may be dispersed in the base portion RS. The light absorbent LA may absorb visible light. The light absorbent LA may include a black pigment or a black dye. For example, the light absorbent LA may include a carbon black or an aniline black. However, the disclosure is not limited thereto and materials for the light absorbent LA should not be particularly limited as long as they maintain the protective layer BPL in black color. The light absorbent LA may absorb a portion of ultraviolet light. As the light absorbent LA has a property of absorbing ultraviolet light, an activation of a photoinitiator IN (refer to FIG. 9) used for polymerization of the base portion RS may decrease in the process of photocuring and forming the protective layer BPL. However, in the manufacturing method of the display device according to the disclosure, as the protective layer BPL is formed on the reflective layer RL, the protective layer BPL with a high degree of polymerization and a high degree of curing may be formed even though the light absorbent LA has the property of absorbing ultraviolet light. This will be described in detail later.

The protective layer BPL may have an optical density (OD) equal to or greater than about 3. As the protective layer BPL has an optical density (OD) equal to or greater than about 3, an amount of light reflected to the outside among lights incident into the protective layer BPL from the outside may be reduced.

The protective layer BPL may include the polymer bead BA therein. The polymer bead BA included in the protective layer BPL may have a core-shell structure. For example, the polymer bead BA may include a shell portion and a core portion surrounded by the shell portion. The core portion may contain gas. For example, the core portion may include air. The shell portion may include a polymer. As the protective layer BPL includes the polymer bead BA, the protective layer BPL may serve as a cushion layer. For example, in case that external impacts are applied to the protective layer BPL, the polymer bead BA may serve as an elastomer to absorb the external impacts, and thus, the protective layer BPL may serve as a cushion layer. Accordingly, the protective layer BPL may protect the display panel DP from external impacts.

The protective layer BPL may have a thickness TB equal to or greater than about 150 μm and equal to or less than about 200 μm. In case that the thickness TB of the protective layer BPL is less than about 150 μm, the impact resistance of the protective layer BPL may be insufficient. In case that the thickness TB of the protective layer BPL is greater than about 200 μm, the thickness of the display device ED (refer to FIG. 1) may increase.

The protective layer BPL may include about 20 vol % or more of the light absorbent LA in relation to a total volume of the protective layer BPL. In case that the protective layer BPL includes less than about 20 vol % of the light absorbent LA in relation to the total volume of the protective layer BPL, the light blocking function of the protective layer BPL may be insufficient.

The protective layer BPL may include about 20 vol % or more of the polymer bead BA in relation to the total volume of the protective layer BPL. In case that the protective layer BPL includes less than about 20 vol % of the polymer bead BA in relation to the total volume of the protective layer BPL, the impact resistance of the protective layer BPL may be insufficient.

The base portion RS may serve as a matrix in which the polymer bead BA and the light absorbent LA are dispersed. The base portion RS may be formed by polymerizing and curing a base resin P-RS (refer to FIG. 9) by the photoinitiator IN (refer to FIG. 9) in a coating composition CL (refer to FIG. 9).

According to the embodiment, the display device ED (refer to FIG. 1) may include the display panel DP, the reflective layer RL disposed under the display panel DP, and the protective layer BPL including the base portion RS, the light absorbent LA, and the polymer bead BA and provided under the reflective layer RL as a single layer. Accordingly, the protective layer BPL may substantially simultaneously have light blocking characteristics and impact resistance characteristics. Since the protective layer BPL has a thin thickness, the display device ED (refer to FIG. 1) may have thin thickness and may have sufficient reliability.

Figure 5:
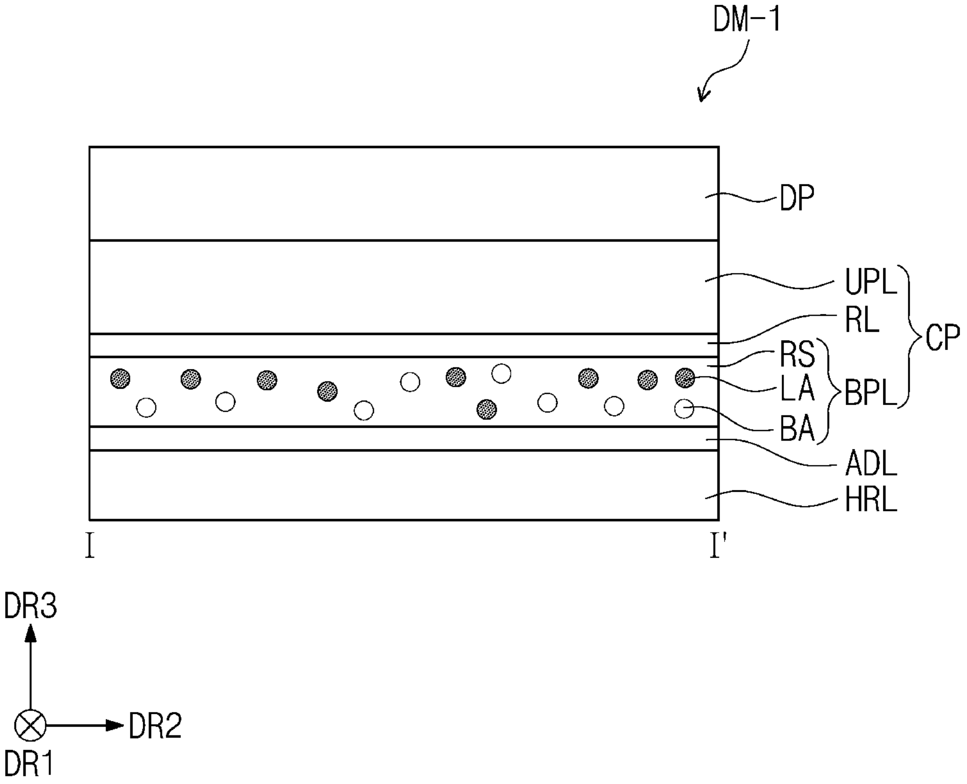
FIG. 5 is a schematic cross-sectional view of a display module according to an embodiment of the disclosure.

FIG. 5 is a schematic cross-sectional view of a display module DM-1 according to an embodiment of the disclosure. In FIG. 5, descriptions of the same elements as those shown in FIGS. 1 to 4 will not be repeated again, and descriptions will be focused on different features from those of FIGS. 1 to 4.

Different from the display module DM described with reference to FIGS. 1 to 4, the display module DM-1 shown in FIG. 5 may include a heat dissipation layer HRL disposed under a protective layer BPL.

Referring to FIG. 5, the display module DM-1 may include the heat dissipation layer HRL disposed under the protective layer BPL. The heat dissipation layer HRL may dissipate heat generated from members of the display device ED (refer to FIG. 1) such as the display panel DP. For example, the heat dissipation layer HRL may include copper (Cu). The heat dissipation layer HRL may be formed through a process different from that of the protective layer BPL.

The display module DM-1 may include an adhesive layer ADL disposed between the protective layer BPL and the heat dissipation layer HRL. The heat dissipation layer HRL may be attached to the protective layer BPL by the adhesive layer ADL. The adhesive layer ADL may be a pressure sensitive adhesive (PSA) film or an adhesive resin layer.

Hereinafter, the manufacturing method of the display device will be described in detail with reference to FIGS. 6 to 10. Features of the display device described with reference to FIGS. 1 to 5 will not be repeated again, and descriptions will be focused on the method of manufacturing the display device.

Figure 6:
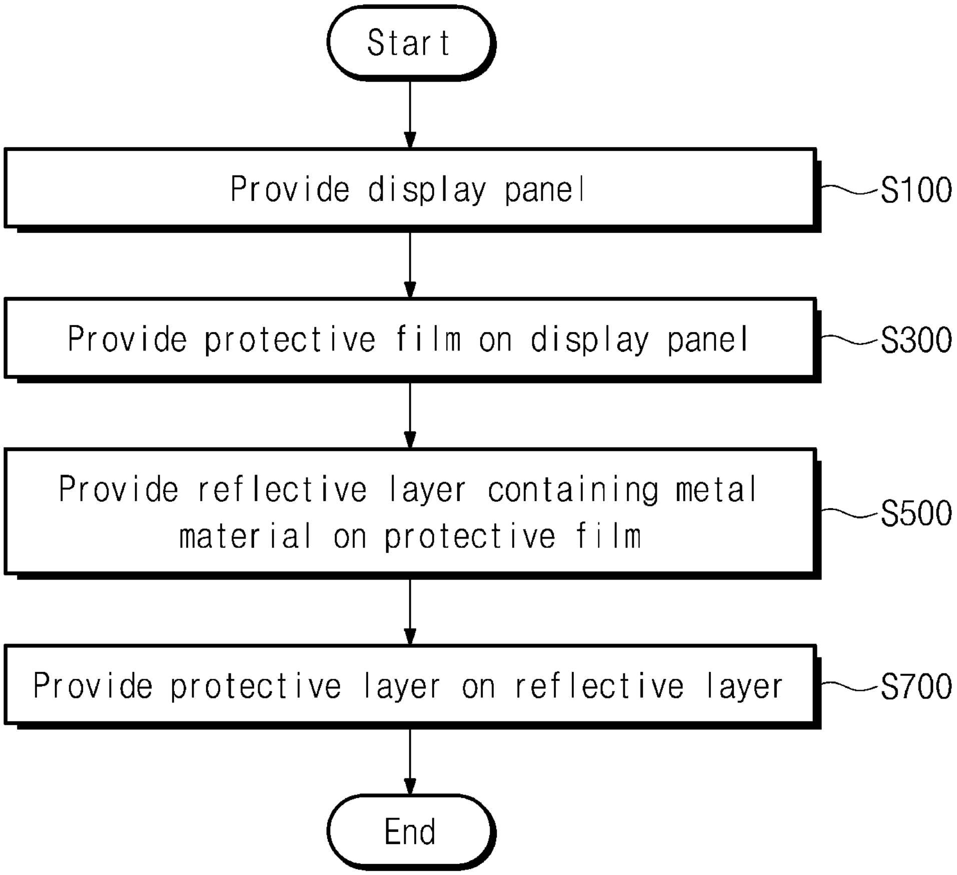
FIG. 6 is a flowchart of a method of manufacturing a display device according to an embodiment of the disclosure.
Figure 7:
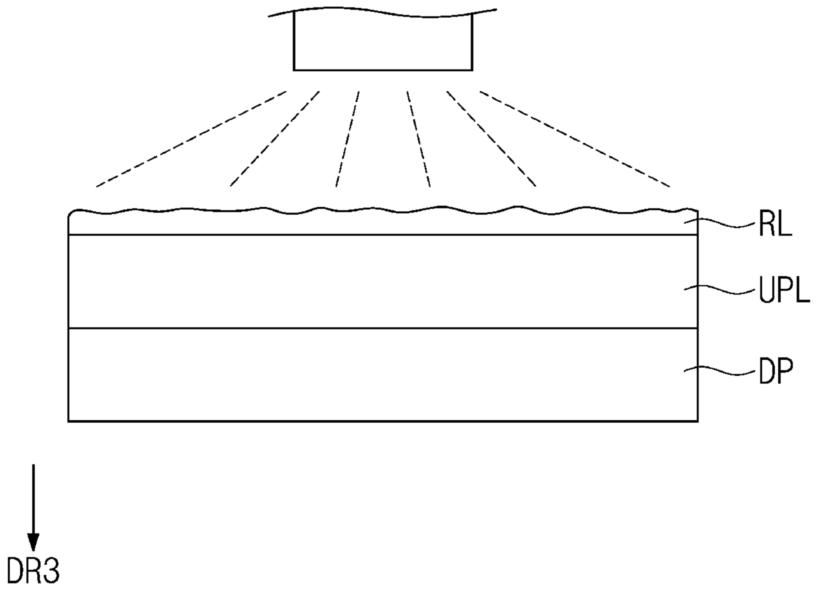
FIG. 7 is a schematic cross-sectional view illustrating a process of the manufacturing method of the display device according to an embodiment of the disclosure.

FIG. 6 is a flowchart of the method of manufacturing the display device according to an embodiment of the disclosure. FIG. 7 is a schematic cross-sectional view illustrating a process of the manufacturing method of the display device according to an embodiment of the disclosure.

Referring to FIG. 6, the manufacturing method of the display device may include providing a display panel (S100), providing a protective film on the display panel (S300), providing a reflective layer including a metal on the protective film (S500), and providing a protective layer on the reflective layer (S700).

FIG. 7 is a schematic cross-sectional view showing a process of providing a reflective layer including a metal on the protective film. Referring to FIG. 7, the providing of the reflective layer including a metal on the protective film (S500) may include depositing a metal on the protective film UPL or providing metal paste (or a metal in a paste) on the protective film UPL to form a reflective layer RL on the protective film UPL.

Figure 8:
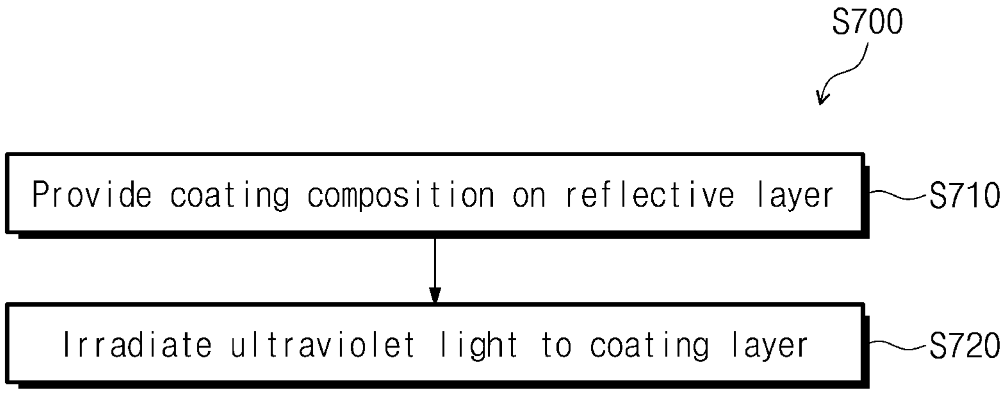
FIG. 8 is a flowchart of a process of a method of manufacturing a display device according to an embodiment of the disclosure.
Figure 9:
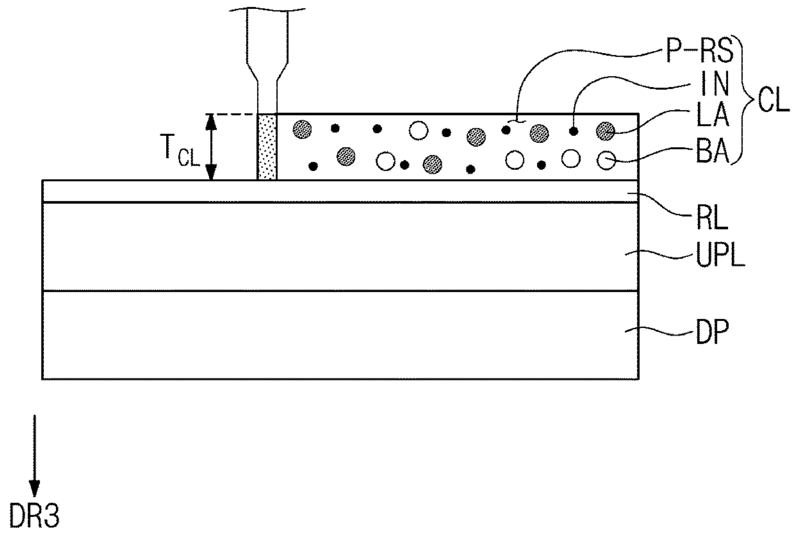
FIG. 9 is a schematic cross-sectional view illustrating a process of the manufacturing method of the display device according to an embodiment of the disclosure.
Figure 10:
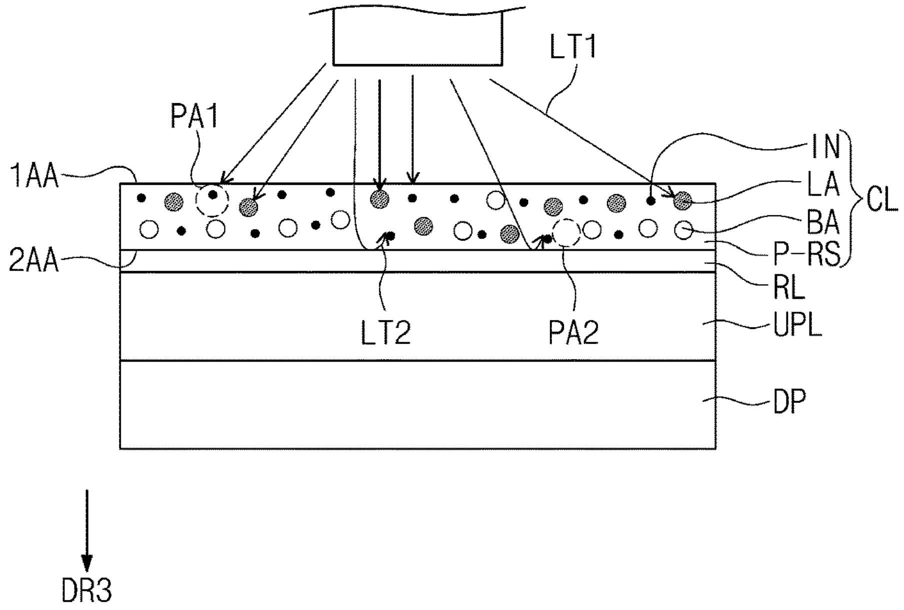
FIG. 10 is a schematic cross-sectional view illustrating a process of the manufacturing method of the display device according to an embodiment of the disclosure.

FIG. 8 is a flowchart of processes of the manufacturing method of the display device according to an embodiment of the disclosure. FIG. 9 is a schematic cross-sectional view illustrating a process of the manufacturing method of the display device according to an embodiment of the disclosure. FIG. 10 is a schematic cross-sectional view illustrating a process of the manufacturing method of the display device according to an embodiment of the disclosure. Referring to FIG. 8, the providing of the protective layer on the reflective layer (S700) may include providing a coating composition CL on the reflective layer RL (S710) and irradiating ultraviolet lights LT1 and LT2 onto the coating layer CL to form a protective layer BPL (S720). The coating layer CL may be a layer formed by providing the coating composition CL on the reflective layer RL and is assigned with the same reference numeral as the coating composition CL.

FIG. 9 is a schematic cross-sectional view showing the process of the providing of a coating composition CL on the reflective layer RL (S710). Referring to FIG. 9, the coating composition CL provided on the reflective layer RL (S710) may include a base resin P-RS, a light absorbent LA, a polymer bead BA, and a photoinitiator IN. The coating composition CL may be directly coated on the reflective layer RL in the providing of a coating composition CL on the reflective layer RL (S710). The coating layer CL may be formed by the coating composition CL coated on the reflective layer RL. The providing of a coating composition CL on the reflective layer RL (S710) may include coating the coating composition CL on the reflective layer RL to form the coating layer CL on the reflective layer RL with a thickness $T_{CL}$ equal to or greater than about 150 μm and equal to or less than about 200 μm.

The coating composition CL may include a photoinitiator IN. The photoinitiator IN may be activated by ultraviolet light. In case that the photoinitiator IN is activated by ultraviolet light, the base resin P-RS included in the coating composition CL may be polymerized and cured, and thus, the protective layer BPL may be formed. For example, the photoinitiator IN may be a triazine-based photoinitiator, an acetophenone-based photoinitiator, a benzophenone-based photoinitiator, a thioxanthone-based photoinitiator, a benzoin-based photoinitiator, a phosphorus-based photoinitiator, an oxime-based photoinitiator, or mixtures thereof. However, the disclosure should not be limited thereto or thereby.

According to an embodiment, the coating composition CL may include a polymer bead BA. The polymer bead BA may have a core-shell structure. The polymer bead BA may have a structure in which the core portion is gas, and the shell portion is polymer.

Referring to FIG. 10, the irradiating of the ultraviolet lights LT1 and LT2 to the coating layer CL to form a protective layer BPL (S720) may include irradiating the ultraviolet lights LT1 and LT2 to the coating layer CL from above a surface of the coating layer CL, which is spaced apart from the reflective layer RL. The irradiating of the ultraviolet lights LT1 and LT2 to the coating layer CL may include activating the photoinitiator IN and curing the coating layer CL to form the protective layer BPL (refer to FIG. 4). The ultraviolet lights LT1 and LT2 may have a wavelength equal to or greater than about 300 nm and equal to or less than about 400 nm.

In the irradiating of the ultraviolet lights LT1 and LT2 to the coating layer CL from above a surface of the coating layer CL, which is spaced apart from the reflective layer RL, (S720), direct light LT1 may be directly irradiated to the surface of the coating layer CL from the outside, and the direct light LT1 may be reflected by the reflective layer RL after passing through the coating layer CL and may be provided to the coating layer CL as indirect light LT2.

The direct light LT1 may activate the photoinitiator IN dispersed in a first portion PA1 of the coating layer CL, which is spaced apart from the reflective layer RL. Due to the light absorbent LA included in the coating layer CL, an amount of the direct light LT1 that reaches a second portion PA2 of the coating layer CL, which is adjacent to the reflective layer RL, may be reduced. Accordingly, an activation degree of the photoinitiator IN dispersed in the second portion PA2 of the coating layer CL, which is adjacent to the reflective layer RL, may be smaller than an activation degree of the photoinitiator IN dispersed in the first portion PA1. In case that the activation degree of the photoinitiator IN dispersed in the second portion PA2 is smaller than the activation degree of the photoinitiator IN dispersed in the first portion PA1, the degree of curing of the second portion PA2 may be relatively small. Thus, creases may occur in the protective layer BPL (refer to FIG. 4) at a portion corresponding to the second portion PA2, and a reliability of the protective layer may be reduced.

According to the manufacturing method of the display device, the photoinitiator IN dispersed in the second portion PA2 may be activated by the indirect light LT2 reflected by the reflective layer RL. According to the manufacturing method of the display device, even though the direct light LT1 is irradiated to a first surface 1AA of the coating layer CL spaced apart from the reflective layer RL and a portion of the direct light LT1 is absorbed by the light absorbent LA, a second surface 2AA of the coating layer CL, which is adjacent to the reflective layer RL, may be cured by the indirect light LT2. For example, since the manufacturing method of the display device includes the activating of the photoinitiator IN using the indirect light LT2, the protective layer BPL (refer to FIG. 4) with excellent reliability may be formed on the reflective layer RL.

Figure 11:
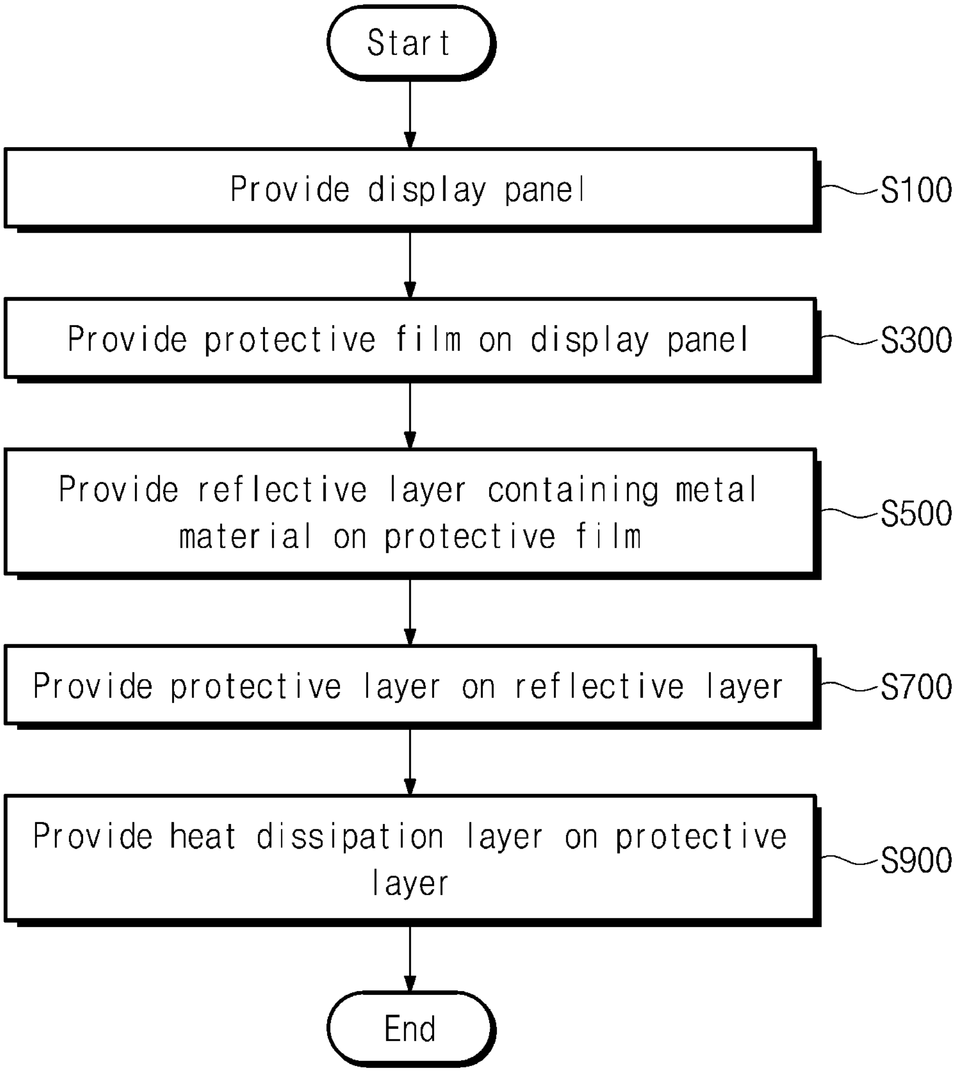
FIG. 11 is a flowchart of a method of manufacturing a display device according to an embodiment of the disclosure.

FIG. 11 is a flowchart of the manufacturing method of the display device according to an embodiment of the disclosure. The manufacturing method of the display device may include providing a heat dissipation layer HRL on the protective layer BPL (S900) after the providing of the protective layer (S700). The heat dissipation layer HRL may include copper.

As the display device includes a protective layer that includes the base portion, the light absorbent, and the polymer bead and is provided in a single layer, the display device may have a thin thickness while having a superior impact resistance, visibility, and reliability.

The manufacturing method of the display device may include providing a reflective layer and the forming a protective layer on the reflective layer. The forming of the protective layer on the reflective layer may include providing a coating composition including a base resin, a light absorbent, a polymer bead, and a photoinitiator on the reflective layer and irradiating ultraviolet light to a surface of a coating layer, which is spaced apart from the reflective layer. Accordingly, the coating layer in black color may be sufficiently cured by a direct light and an indirect light using the reflective layer, and thus, the display device may have a thin thickness while having a superior impact resistance, visibility, and reliability.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments.

What is claimed is:

1. An electronic device comprising a display device, wherein the display device comprises:
- a display panel;
- a protective film disposed directly under the display panel;
- a reflective layer disposed directly under the protective film and comprising a metal; and
- a protective layer disposed directly under the reflective layer and provided in a single layer, wherein
- the protective layer comprises:
  - a base portion;
  - a light absorbent; and
  - a polymer bead, and
- the light absorbent comprises a black pigment or a black dye and is dispersed in the base portion.

2. The electronic device of claim 1, wherein the protective layer is disposed directly on a lower surface of the reflective layer.

3. The electronic device of claim 1, wherein the base portion comprises an acrylic resin or a silicone resin.

4. The electronic device of claim 1, wherein the light absorbent absorbs visible light.

5. The electronic device of claim 1, wherein the reflective layer is disposed directly on a lower surface of the protective film.

6. The electronic device of claim 1, wherein the reflective layer comprises at least one of Ag, Mg, Cu, Al, Pt, Pd, Au, Ni, Nd, Ir, Cr, Li, Ca, Mo, Ti, and W.

7. The electronic device of claim 1, further comprising:
- a heat dissipation layer disposed under the protective layer.

8. The electronic device of claim 1, wherein the protective layer comprises about 20 vol % or more of the light absorbent in relation to a total volume of the protective layer.

9. The electronic device of claim 1, wherein the protective layer comprises about 20 vol % or more of the polymer bead in relation to a total volume of the protective layer.

10. The electronic device of claim 1, wherein the polymer bead comprises:
- a shell portion comprising a polymer; and
- a core portion comprising gas and surrounded by the shell portion.

11. The electronic device of claim 1, wherein a thickness of the protective layer is equal to or greater than about 150 micrometers and equal to or less than about 200 micrometers.

12. The electronic device of claim 1, wherein an optical density of the protective layer is equal to or greater than about 3.

13. An electronic device comprising a display device, wherein the display device comprises:
- a display panel;
- a window disposed on the display panel; and
- a lower member disposed under the display panel, wherein
- the lower member comprises:
  - a protective film disposed directly under the display panel;
  - a reflective layer disposed directly on a lower portion of the protective film and directly under the protective film and comprising a metal; and
  - a protective layer disposed directly on a lower portion of the reflective layer and directly under the reflective layer
- the protective layer comprises:
  - a base portion;
  - a light absorbent; and
  - a polymer bead, and
- the light absorbent comprises a black pigment or a black dye and is dispersed in the base portion.

14. The electronic device of claim 13, wherein the reflective layer comprises at least one of Ag, Mg, Cu, Al, Pt, Pd, Au, Ni, Nd, Ir, Cr, Li, Ca, Mo, Ti, and W.

15. The electronic device of claim 13, wherein the protective layer comprises about 20 vol % or more of the light absorbent in relation to a total volume of the protective layer.

16. The electronic device of claim 13, wherein the protective layer comprises about 20 vol % or more of the polymer bead in relation to a total volume of the protective layer.

17. The electronic device of claim 13, wherein the polymer bead comprises:
- a shell portion comprising a polymer; and
- a core portion comprising gas and surrounded by the shell portion.

18. The electronic device of claim 13, wherein an optical density of the protective layer is equal to or greater than about 3.

19. The electronic device of claim 1, wherein the reflective layer is configured to reflect ultraviolet (UV) light and the base portion is derived from a coating composition including a photoinitiator activated by the UV light.

20. The electronic device of claim 13, wherein the reflective layer is configured to reflect ultraviolet (UV) light and the base portion is derived from a coating composition including a photoinitiator activated by the UV light.

* * * * *